United States Patent [19]

Alderson

[11] Patent Number: 4,666,371
[45] Date of Patent: May 19, 1987

[54] GAS TURBINE ENGINE HAVING IMPROVED RESISTANCE TO FOREIGN OBJECT INGESTION DAMAGE

[75] Inventor: Max Alderson, Kings Newton, England

[73] Assignee: Rolls-Royce plc, London, England

[21] Appl. No.: 341,622

[22] Filed: Jan. 22, 1982

[30] Foreign Application Priority Data

Mar. 25, 1981 [GB] United Kingdom ............... 8109286

[51] Int. Cl.[4] .................... F01D 21/04; F01D 11/08
[52] U.S. Cl. ........................................ 415/197; 415/9
[58] Field of Search ............... 415/196, 197, 174, 9, 415/212 A

[56] References Cited

U.S. PATENT DOCUMENTS

| | | | |
|---|---|---|---|
| 2,742,224 | 4/1956 | Burhans | 415/212 A |
| 3,053,694 | 9/1962 | Daunt et al. | 415/212 |
| 3,575,427 | 4/1971 | Lapac | 415/174 |
| 3,603,599 | 9/1971 | Laird | 415/174 X |
| 3,974,313 | 10/1976 | James | 415/9 X |
| 4,149,824 | 4/1979 | Adamson | 415/197 X |
| 4,199,300 | 4/1980 | Tubbs | 415/9 |

FOREIGN PATENT DOCUMENTS 28183 5/1981 European Pat. Off. ........... 415/196

Primary Examiner—Harvey C. Hornsby
Assistant Examiner—Frankie L. Stinson
Attorney, Agent, or Firm—Cushman, Darby & Cushman

[57] ABSTRACT

A gas turbine engine has an axial flow compressor, the inner wall of which is provided with a lining adapted to capture and retain any small hard foreign objects impinging upon it. The lining consists of an aluminum alloy sheet having a silicone rubber coating bonded to one side and a stainless steel honeycomb structure bonded to the other side. The honeycomb structure is bonded in turn to the inner wall of the compressor casing. The silicone rubber coating has a plurality of finely divided hollow silica microspheres dispersed within it.

7 Claims, 3 Drawing Figures

GAS TURBINE ENGINE HAVING IMPROVED RESISTANCE TO FOREIGN OBJECT INGESTION DAMAGE

This invention relates to a gas turbine engine having improved resistance to damage resulting from their ingestion of foreign objects.

Gas turbine engines are particularly prone to damage arising from their ingestion of foreign objects. There is a wide range of objects which are commonly ingested by gas turbine engines but those which often cause the most damage are small, hard unbreakable objects. These may be stones or grit, or sometimes nuts, bolts, rivets or seals which have become detached from the engine or surrounding structure. These objects tend to pass through the various stages of the engine compressor causing increasing amounts of damage as they encounter smaller downstream compressor blades. Further damage can occur if the objects break off pieces from compressor blades since those pieces then in turn cause damage to other compressor blades.

It is an object of the present invention to provide a gas turbine engine having improved resistance to damage resulting from its ingestion of small hard foreign objects.

According to the present invention a gas turbine engine comprises a compressor having a casing enclosing a plurality of stator and rotor aerofoil blades, at least a portion of the inner wall of said casing having a lining thereon which lining comprises a continuous sheet of a metallic material, support means adapted to support said sheet of metallic material and space it apart from said inner wall of said casing, and a layer of an elastomeric material bonded to said sheet of metallic material, said layer of elastomeric material and said support means being on opposite sides of said sheet of metallic material, said sheet of metallic material and said layer of elastomeric material bonded thereto being of such a combined thickness as to retard and be penetrated by any small hard foreign objects ingested by said engine and impinging thereon, said support means being adapted to capture and retain any such small hard foreign objects penetrating said sheet of metallic material and layer of elastomeric material.

Said elastomeric material preferably has a plurality of finely divided particles dispersed therein.

Said finely divided particles may be hollow silica microspheres.

Said support means may be a honeycomb structure.

Said honeycomb structure is preferably metallic.

Said sheet of metallic material may be formed from an aluminium alloy.

Said elastomeric material may be a silicone rubber.

Said lining may be so positioned in said casing as to surround at least some of said rotor aerofoil blades.

The invention will now be described, by way of example, with reference to the accompanying drawings in which.

Figure 1:
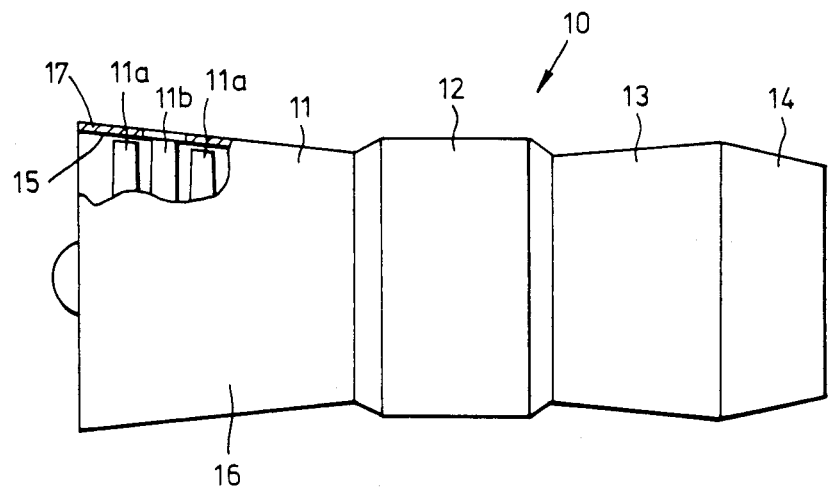
FIG. 1 is a partially sectioned side view of a gas turbine engine in accordance with the present invention.

With reference to FIG. 1, a gas turbine engine generally indicated at 10 comprises, in axial flow series, a compressor 11, combustion equipment 12, a turbine 13 drivingly connected to the compressor 11 and an exhaust nozzle 14. The engine 10 functions in the conventional manner, that is, air entering the compressor is compressed by alternate annular arrays of rotor blades and stator aerofoil vanes 11a and 11b respectively before entering the combustion equipment 12. There it is mixed with fuel and the mixture combusted to provide exhaust gases which then drive the turbine 13 before being exhausted to atmosphere through the exhaust nozzle 14.

The air which enters the compressor 11 sometimes carries small hard foreign objects such as stones, nuts, bolts etc. which are usually impacted by the first or second stages of aerofoil blades 11a within the compressor 11. They then tend to impact the inner wall 15 of the compressor casing 16 before passing further down the compressor 11, causing increasing amounts of damage as they proceed. However those portions of inner wall 15 of the compressor casing 16 which surround the rotor blades are provided with a lining 17 which is adapted to capture and retain the foreign objects as it is impinged by them, thereby preventing the foreign objects causing further engine damage.

Figure 2:
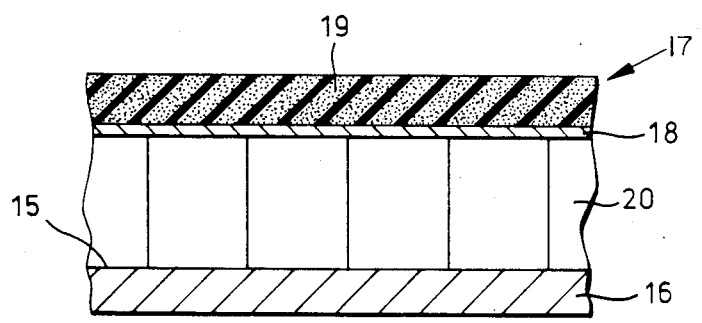
FIG. 2 is an enlarged view of a portion of the gas turbine engine shown in FIG. 1.

The lining 17, which can be seen in detail in FIG. 2, consists of a continuous sheet 18 of an aluminium alloy having a layer of silicone rubber 19 bonded to one side and a honeycomb structure 20 attached to the other side. The honeycomb structure 20 provides support for the sheet 18 and is attached to the inner wall 15 of the compressor casing 16 so that the sheet 18 and compressor casing 16 are spaced apart from each other.

The silicone rubber layer 19 has a large number of hollow silica microspheres disposed within it, although other particulate material could be used in their place. This filled silicone rubber layer 19 serves a dual function. Firstly, since it is adjacent the tips of the compressor rotor blades 11a it serves as an attrition coating. That is, in operation the tips of the rotor blades 11a abrade the layer 19 until a small clearance is defined between them, thereby ensuring that as little air as possible leaks between the tips of the rotor blades 11a and the layer 19. Such attrition coatings are in themselves well known in the construction of gas turbine engine compressors. The second function served by the layer 19 is to retard the velocity of any small hard foreign objects which may impinge upon it. However the layer 19 is of such a thickness that although it retards the velocity of the foreign object, it is nevertheless penetrated by that object so that the object subsequently impinges upon the metallic sheet 18. The thickness of the metallic sheet 18 is similarly chosen so that although it provides further retardation of the foreign object velocity, it is nevertheless of such a thickness that is is penetrated by the foreign object. Thus the filled silicone rubber layer 19 and the aluminium alloy sheet 18 together provide retardation of the velocity of foreign objects impinging upon them.

After passing through the layer 19 and sheet 18, the foreign object encounters the stainless steel honeycomb structure 20, and the compressor casing wall 16. By the time the foreign object has reached this point, its velocity has been sufficiently retarded to ensure that it does not penetrate the casing 16. Instead it proceeds to ricochet between the casing 16 and the sheet 18 as its velocity is further retarded by the cell walls of the honeycomb structure 20 until it finally comes to rest within the honeycomb structure 20. The honeycomb structure 20 thus captures and retains the foreign object, thereby preventing it from causing further damage within the compressor 16.

Figure 3:
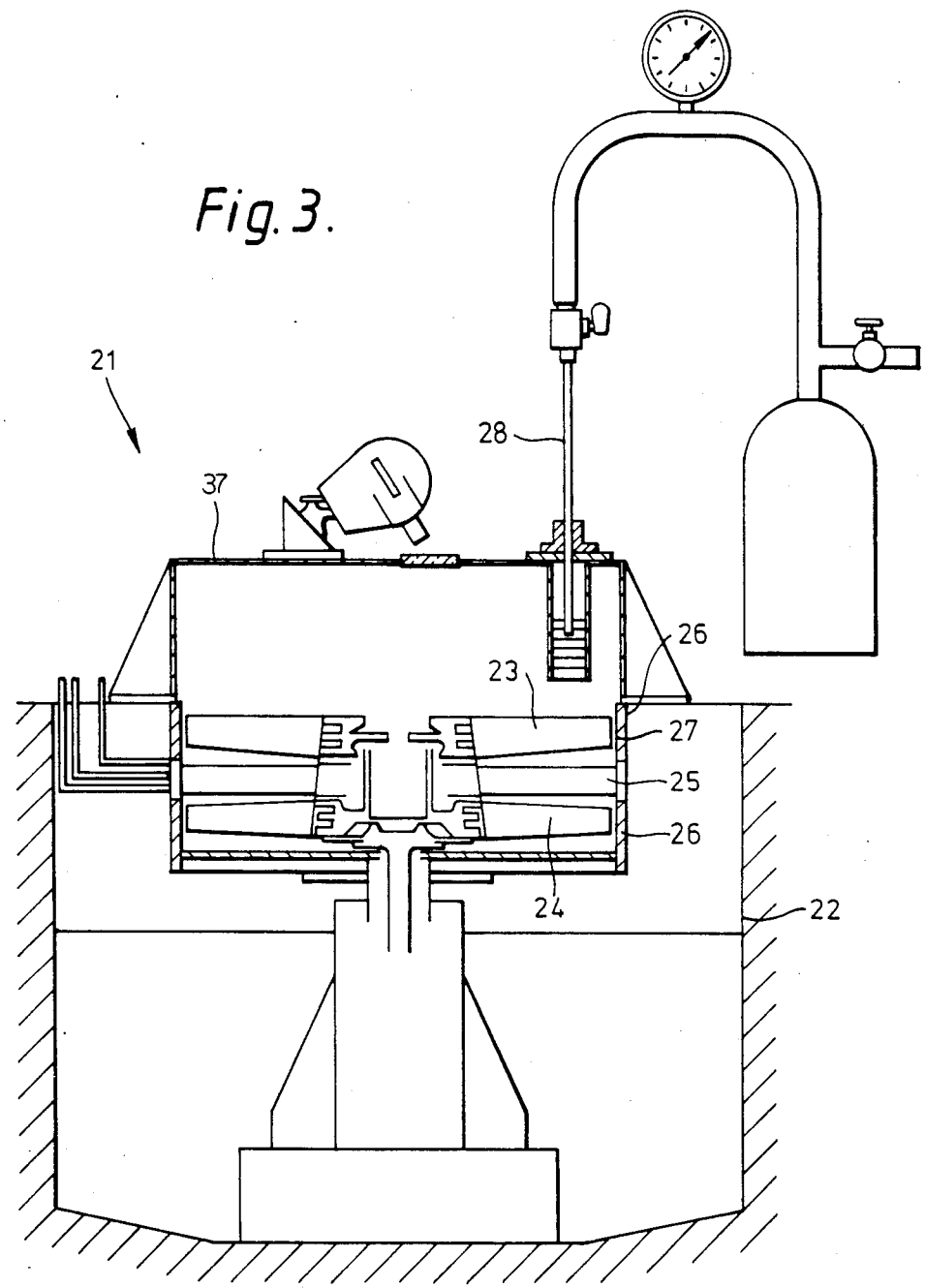
FIG. 3 is a diagrammatic sectioned side view of apparatus used for testing the effectiveness of apparatus in accordance with the present invention.

The effectiveness of the lining 17 in capturing and retaining foreign objects was investigated using the apparatus shown in FIG. 3. The apparatus generally indicated at 21 comprises a pit 22 which contains the first two stages of a typical gas turbine engine compressor enclosed within a casing 26. More specifically it contains first and second rotor aerofoil blade stages 23 and 24 with a stator vane stage 25 interposed between them.

Each of the stages of rotor blades 23 and 24 is surrounded by a lining 27 which corresponds in structure with the lining 17 shown in FIG. 2. The lining 27 consists of a continuous sheet of an aluminium alloy which is 0.01 inches thick, a 0.2 inches thick layer of silicone rubber having hollow silica microspheres dispersed within it and a stainless steel honeycomb structure having 0.5 inches square mesh and 0.5 inches deep. The stainless steel honeycomb structure is attached to the casing 26. The silicone rubber was supplied by Dow Corning Corporation and is designated 93-118.

The pit 22 is provided with a cover 37 and is evacuated to eliminated windage. A compressed air powered gun 28 projects through the pit cover 27 is adapted to fire missiles into the first rotor blade stage 23. The missiles each consist of a steel slug 0.25 inches diameter, 0.3 inches long and weighing 1.9 grams.

In the tests, the rotor blade stages 23 and 24 were driven at 7000 revolutions per minute by an external power source (not shown). Missiles were then fired into first rotor blade stage 23 at differing radial positions (with respect to the axis of rotation of the rotor stages 23 and 24) and at differing velocities. The actual radial positions and missile velocities were as follows:

| Radius (inches) | Missile Speed (ft/sec) |
| --- | --- |
| 9 | 50 |
|  | 150 |
| 12 | 50 |
|  | 150 |
| 16 | 50 |
|  | 150 |

This range of test conditions were chosen to represent typical conditions under which foreign object ingestion by aircraft mounted gas turbine engines occurs. Of the two missile speeds chosen, 50 ft/sec. is representative of the velocity of debris picked up from a runway during taxiing or landing and 150 ft/sec representative of the velocity of debris ingested at take-off.

A total of 26 identical missiles were fired into the rotor blade stage 23. 13 missiles ricocheted upwards from the rotor blade stage 23 and were not ingested. Of the remaining ingested missiles, 9 were captured and retained by the lining 27 surrounding the first rotor blade stage 23, 2 were captured and retained by the lining 27 surrounding the second rotor blade stage 24, one missile passed through both stages 23 and 24 and was found in the bottom of the pit 22 and one was unaccounted for.

In terms of overall efficiency therefore, 50% of the missiles were not ingested, 85% of the missiles did not get past the first rotor blade stage 23 and 92% of the missiles did not get past the second rotor blade stage 24. Alternatively if only the ingested missiles are considered, 69% of all ingested missiles did not get past the first rotor blade stage 23 and 85% did not get past the second rotor blade stage 24.

It will be appreciated that although the present invention has been described with respect to a lining 17 which only surrounds rotor aerofoil blade stages, the lining 17 could in fact be located in other positions where it could capture and retain small hard foreign objects. Moreover whilst the filled silicone rubber layer 19 can be used as an attrition coating, this may not be desirable in certain circumstances. If not, a further aluminium alloy sheet similar to the sheet 18 could be placed over the filled silicone rubber layer 19 so that additional retardation of the foreign object velocity could be achieved.

I claim:

1. A gas turbine engine comprising:
   a compressor including a casing having an inner wall, a plurality of stator and rotor aerofoil blades enclosed within said casing, and a lining carried on at least a portion of the inner wall of said casing and at least surrounding said rotor blades; and
   said lining comprising a continuous sheet of aluminium alloy material capable of being penetrated by any small hard foreign objects ingested into the engine, support means attached to the inner wall of said casing and directly supporting said sheet of aluminium alloy material from and in spaced apart relationship to said inner wall of said casing, and a layer of elastomeric material bonded to said sheet of aluminium alloy material and defining an attrition coating abradable by and cooperating with said rotor blades to provide a seal therebetween, said layer of elastomeric material and said support means being on opposite sides of said sheet of aluminium alloy material, said layer of elastomeric material and said sheet of aluminium alloy material having a combined thickness sufficient to retard and be penetrated by said any small hard foreign objects ingested by said engine and impinging thereon, said support means having a configuration for capturing and retaining any such small hard foreign objects respectively penetrating said layer of elastomeric material and sheet of aluminium alloy material.

2. A gas turbine engine as claimed in claim 1 wherein a plurality of finely divided particles are dispensed within said elastomeric material.

3. A gas turbine engine as claimed in claim 2 wherein said finely divided particles are hollow glass microspheres.

4. A gas turbine engine as claimed in claim 3 wherein said elastomeric material is a silicon rubber.

5. A gas turbine engine as claimed in claim 1 wherein said support means is a honeycomb structure.

6. A gas turbine engine as claimed in claim 5 wherein said said honeycomb structure is metallic.

7. A gas turbine engine as claimed in claim 1 wherein said elastomeric material is a silicone rubber.

* * * * *